(12) United States Patent
Choi et al.

(10) Patent No.: US 8,427,973 B2
(45) Date of Patent: Apr. 23, 2013

(54) COGNITIVE RADIO COMMUNICATION APPARATUS AND RADIO ACCESS TECHNOLOGY SELECTION METHOD OF COGNITIVE RADIO COMMUNICATION APPARATUS

(75) Inventors: Hyun Ho Choi, Suwon-si (KR); Sung Hyun Choi, Seoul (KR); Young Soo Kim, Seoul (KR); Young Woo Hwang, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 377 days.

(21) Appl. No.: 12/846,163

(22) Filed: Jul. 29, 2010

(65) Prior Publication Data
US 2011/0032911 A1 Feb. 10, 2011

(30) Foreign Application Priority Data
Aug. 4, 2009 (KR) .................. 10-2009-0071655

(51) Int. Cl.
*H04L 12/26* (2006.01)
*H04W 4/00* (2009.01)
*G06F 15/177* (2006.01)

(52) U.S. Cl.
USPC ..................... 370/252; 370/329; 709/220

(58) Field of Classification Search ................... None
See application file for complete search history.

(56) References Cited

U.S. PATENT DOCUMENTS

| | | | |
|---|---|---|---|
| 6,163,700 A | 12/2000 | Hussain et al. | |
| 8,140,018 B2 * | 3/2012 | Abedi | 455/63.1 |
| 8,160,163 B1 * | 4/2012 | Yucek et al. | 375/260 |
| 2009/0234937 A1 * | 9/2009 | Buljore et al. | 709/220 |
| 2009/0239570 A1 * | 9/2009 | Koyanagi et al. | 455/525 |
| 2009/0257398 A1 * | 10/2009 | Koyanagi et al. | 370/331 |
| 2010/0172254 A1 * | 7/2010 | Sachs | 370/252 |
| 2011/0003590 A1 * | 1/2011 | Yoon et al. | 455/432.1 |
| 2011/0026503 A1 * | 2/2011 | Mueck et al. | 370/338 |
| 2011/0117907 A1 * | 5/2011 | Hooli et al. | 455/422.1 |
| 2011/0134827 A1 * | 6/2011 | Hooli et al. | 370/315 |
| 2011/0194485 A1 * | 8/2011 | Horneman et al. | 370/315 |
| 2011/0237231 A1 * | 9/2011 | Horneman et al. | 455/414.1 |

FOREIGN PATENT DOCUMENTS

| | | |
|---|---|---|
| JP | 08130764 | 5/1996 |
| KR | 1020030050564 | 6/2003 |
| KR | 1020060012210 | 2/2006 |
| KR | 1020060124401 | 12/2006 |

\* cited by examiner

*Primary Examiner* — Clemence Han
(74) *Attorney, Agent, or Firm* — NSIP Law

(57) ABSTRACT

A Cognitive Radio (CR) communication apparatus is provided. The CR communication apparatus may include a determination unit to determine any one of a plurality of Radio Access Technologies (RATs) as a temporary control RAT, an estimation unit to estimate an available resource and a channel state of each common RAT using the temporary control RAT, and a selection unit to calculate an available capacity of each of the common RATs using the available resource and the channel state, and to select an optimum RAT from the common RATs based on the available capacity of each of the common RATs. The common RATs may be used by the CR communication apparatus and a receiving CR communication apparatus from among the plurality of RATs.

24 Claims, 9 Drawing Sheets

FIG. 4

Probe Request Frame Format

| P2P TRANSMITTER ADDRESS | P2P RECEIVER ADDRESS | AVAILABLE RESOURCE OF $RAT_i$ ESTIMATED BY P2P TRANSMITTER |

203

Probe Response Frame Format

| P2P RECEIVER ADDRESS | P2P TRANSMITTER ADDRESS | AVAILABLE RESOURCE OF $RAT_i$ ESTIMATED BY P2P RECEIVER | SINR OF $RAT_i$ ESTIMATED BY P2P RECEIVER |

204

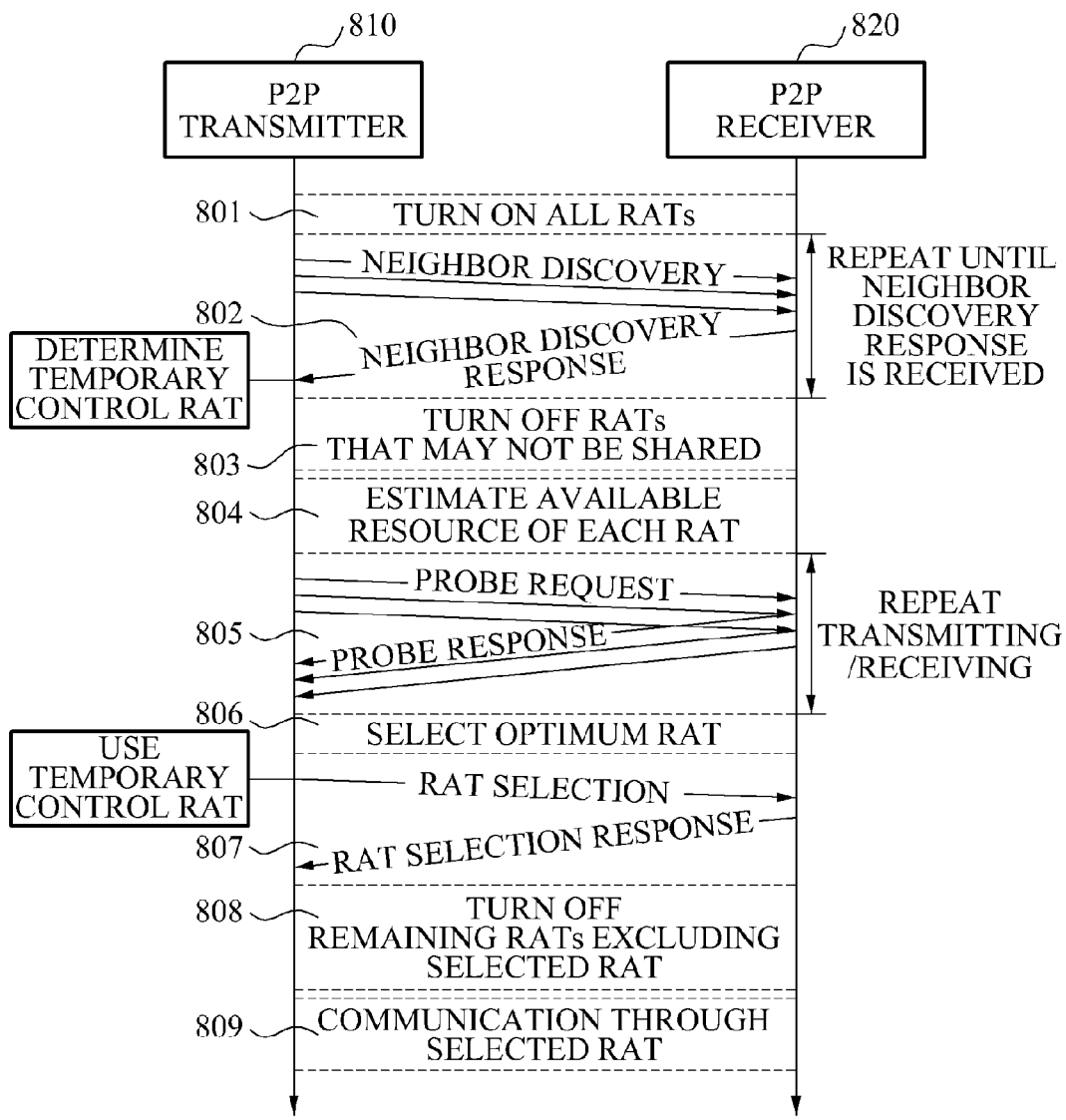

COGNITIVE RADIO COMMUNICATION APPARATUS AND RADIO ACCESS TECHNOLOGY SELECTION METHOD OF COGNITIVE RADIO COMMUNICATION APPARATUS

CROSS-REFERENCE TO RELATED APPLICATION(S)

This application claims the benefit under 35 U.S.C. §119 (a) of Korean Patent Application No. 10-2009-0071655, filed on Aug. 4, 2009, in the Korean Intellectual Property Office, the entire disclosure of which is incorporated herein by reference for all purposes.

BACKGROUND

1. Field

The following description relates to a Cognitive Radio (CR) communication apparatus and a Radio Access Technology (RAT) selection method of the CR communication apparatus.

2. Description of the Related Art

In general, a method of selecting a Radio Access Technology (RAT) with a greatest wireless signal strength may be used as an RAT selection method. Since a wireless signal strength may be determined by a maximum transmission power, an RAT with a highest maximum transmission power may be selected.

However, the conventional RAT selection method may not be able to ascertain an available capacity, that is, a network capacity provided by a corresponding RAT, since the available capacity may not be a function related to only wireless signal strength, and may be associated with a wireless signal strength as well as an amount of wireless resources that may be used by a wireless communication device.

Where an available capacity is not ascertained and an RAT that does not provide a sufficient amount of wireless resources is selected, an amount of wireless resources to be used by a Cognitive Radio (CR) communication apparatus may not be provided. Accordingly, a performance of the CR communication apparatus may be degraded. Thus, an RAT is to be selected based on an available capacity.

SUMMARY

In one general aspect, there is provided a Cognitive Radio (CR) communication apparatus including a determination unit to determine any one of a plurality of Radio Access Technologies (RATs) as a temporary control RAT, an estimation unit to estimate an available resource and a channel state of each common RAT using the temporary control RAT, the common RATs being used by the CR communication apparatus and a receiving CR communication apparatus from among the plurality of RATs, and a selection unit to calculate an available capacity of each of the common RATs using the available resource and the channel state, and to select an optimum RAT from the common RATs based on the available capacity of each of the common RATs.

The determination unit may transmit a neighbor discovery frame to the receiving CR communication apparatus using each of the plurality of RATs, and may determine an RAT, which is used to receive a neighbor discovery response frame from the receiving CR communication apparatus receiving the neighbor discovery frame, as the temporary control RAT.

In one general aspect, there is provided a CR communication apparatus, including an estimation unit to confirm common RATs through a Common Control RAT (CCR), and to estimate an available resource and a channel state of each of the common RATs, the common RATs being used by the CR communication apparatus and an receiving CR communication apparatus, and a selection unit to calculate an available capacity of each of the common RATs using the available resource and the channel state, and to select an optimum RAT from the common RATs based on the available capacity of each of the common RATs.

The selection unit may select the optimum RAT from the common RATs based on a priority of each transmission with respect to transmission traffic, the priority being assigned by a Media Access Control (MAC).

In response to another CR communication apparatus being transmitted an RAT selection frame including the optimum RAT before the CR communication apparatus transmits the RAT selection frame including the optimum RAT, the selection unit may confirm a remaining available capacity excluding a capacity, used by the other CR communication apparatus, from among an available capacity of the optimum RAT, and may select the optimum RAT from the common RATs.

The CR communication apparatus may further include a power unit to, in response to a list of the common RATs being confirmed, turn off remaining RATs excluding the common RATs from among the plurality of RATs, and in response to the optimum RAT being selected, to turn off remaining RATs excluding the selected optimum RAT.

The estimation unit may transmit a probe request frame to the receiving CR communication frame, receive a probe response frame in response to the probe request frame, and estimate the available resource and the channel state using the probe request frame and the probe response frame.

The estimation unit may estimate an idle time ratio of a corresponding channel as an available resource of a first RAT, the first RAT using a Time Division Duplex/Time Division Multiple Access (TDD/TDMA) MAC from among the common RATs.

The estimation unit may estimate a residual bandwidth and an idle time of a corresponding channel as an available resource of a second RAT, the second RAT using a Frequency Division Duplex/Frequency Division Multiple Access (FDD/FDMA) MAC from among the common RATs.

The estimation unit may estimate a number of available codes and a tolerable interference as an available resource of a third RAT, the third RAT using a Code Division Multiple Access (CDMA) MAC from among the common RATs.

The selection unit may calculate the available capacity using at least one of a bandwidth, maximum transmission power, and an amount of traffic load of each of the common RATs.

The selection unit may calculate, as an available capacity of a first RAT, an amount of traffic load of each of a forward link and a reverse link with respect to the receiving CR communication apparatus during an entire time of being associated with an available resource of each of the forward link and the reverse link, the first RAT using a TDD/TDMA MAC from among the common RATs.

The selection unit may calculate, as an available capacity of a second RAT, an amount of traffic load which is transmitted using an available resource of each of a forward link and a reverse link with respect to the receiving CR communication apparatus, the second RAT using a FDD/FDMA MAC from among the common RATs.

The selection unit may select an RAT that maximizes an insignificant available capacity from among available capacities of a forward link and a reverse link with respect to the receiving CR communication apparatus, as the optimum RAT from the common RATs.

The selection unit may select an RAT that maximizes a sum of available capacities of a forward link and a reverse link with respect to the receiving CR communication apparatus, as the optimum RAT from the common RATs.

In another general aspect, there is provided an RAT selection method of a CR communication apparatus, the RAT selection method includes determining any one of a plurality of RATs as a temporary control RAT, estimating an available resource and a channel state of each common RAT using the temporary control RAT, the common RATs being used by the CR communication apparatus and an opposing CR communication apparatus from among the plurality of RATs, calculating an available capacity of each of the common RATs using the available resource and the channel state, and selecting an optimum RAT from the common RATs based on the available capacity of each of the common RATs.

In another aspect, there is provided an RAT selection method of a CR communication apparatus, the RAT selection method includes confirming common RATs through a CCR, and estimating an available resource and a channel state of each of the common RATs, the common RATs being used by the CR communication apparatus and an opposing CR communication apparatus, and calculating an available capacity of each of the common RATs using the available resource and the channel state, and selecting an optimum RAT from the common RATs based on the available capacity of each of the common RATs.

The selecting may include confirming, in response to another CR communication apparatus transmitting an RAT selection frame including the optimum RAT before the CR communication apparatus transmits the RAT selection frame including the optimum RAT, a remaining available capacity excluding a capacity, used by the other CR communication apparatus, from among an available capacity of the optimum RAT, and reselecting the optimum RAT from the common RATs.

The calculating of the available capacity may include calculating the available capacity using at least one of a bandwidth, maximum transmission power, and an amount of traffic load of each of the common RATs.

The calculating of the available capacity may include calculating, as an available capacity of a first RAT, an amount of traffic load of each of a forward link and a reverse link with respect to the opposing CR communication apparatus during an entire time of being associated with an available resource of each of the forward link and the reverse link, the first RAT using a TDD/TDMA MAC from among the common RATs.

The calculating of the available capacity may include calculating, as an available capacity of a second RAT, an amount of traffic load which is transmitted using an available resource of each of a forward link and a reverse link with respect to the opposing CR communication apparatus, the second RAT using a FDD/FDMA MAC from among the common RATs.

The selecting of the optimum RAT may include selecting an RAT that maximizes an insignificant available capacity from among available capacities of a forward link and a reverse link with respect to the opposing CR communication apparatus, as the optimum RAT from the common RATs.

The selecting of the optimum RAT may include selecting an RAT that maximizes a sum of available capacities of a forward link and a reverse link with respect to the opposing CR communication apparatus, as the optimum RAT from the common RATs.

In another general aspect, there is provided a computer-readable recording medium storing a program including instructions to cause a computer to implement an RAT selection method of a CR communication apparatus, including: determining any one of a plurality of RATs as a temporary control RAT, estimating an available resource and a channel state of each common RAT using the temporary control RAT, the common RATs being used by the CR communication apparatus and an opposing CR communication apparatus from among the plurality of RATs, calculating an available capacity of each of the common RATs using the available resource and the channel state, and selecting an optimum RAT from the common RATs based on the available capacity of each of the common RATs.

Other features and aspects may be apparent from the following detailed description, the drawings, and the claims.

BRIEF DESCRIPTION OF THE DRAWINGS

FIGS. 3 through 5 are diagrams illustrating an example of frames exchanged between a Peer to Peer (P2P) transmitter and a P2P receiver.

FIG. 8 is a flowchart illustrating an example of a method of selecting an RAT in a CR communication apparatus.

Figure 1:
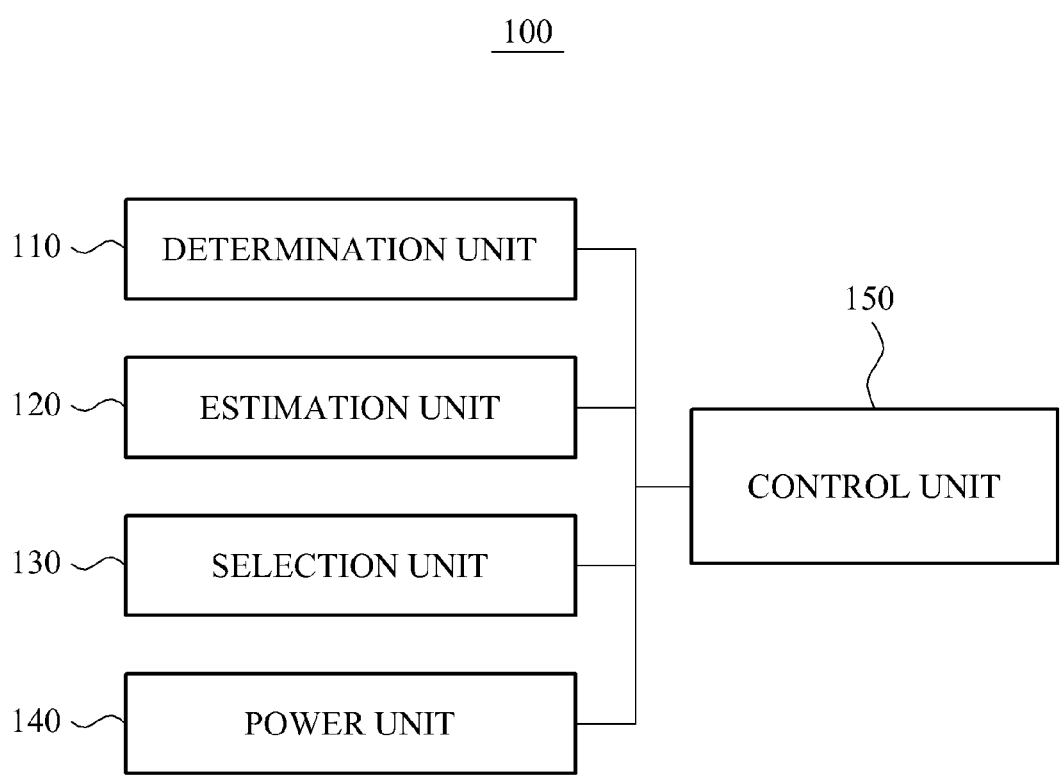
FIG. 1 is a block diagram illustrating a configuration of an example of a Cognitive Radio (CR) communication apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Descriptions of well-known functions and constructions may be omitted for increased clarity and conciseness.

An example Cognitive Radio (CR) communication apparatus may ascertain whether a demand for Peer to Peer (P2P) traffic of an upper layer exists for a P2P communication. In this instance, P2P traffic may be unidirectional traffic or bidirectional traffic. When a demand for P2P traffic exists, all CR communication apparatuses may vary a method of selecting an RAT depending on whether a Common Control Radio Access Technology (CCR) exists, and thereby may select an RAT for P2P communication and transmit the P2P traffic.

Here, a CR communication apparatus reporting a start of the P2P traffic may be referred to as a P2P transmitter, and a CR communication apparatus responding the start of the P2P traffic may be referred to as a P2P receiver. When a bidirectional P2P traffic exists, a P2P receiver may also transmit traffic to a P2P transmitter.

FIG. 1 illustrates a configuration of an example of a CR communication apparatus 100. For example, FIG. 1 illustrates the CR communication apparatus 100 which selects an optimum Radio Access Technology (RAT) within a P2P communication in which a CCR does not exist.

Referring to FIG. 1, the CR communication apparatus 100 includes a determination unit 110, an estimation unit 120, a selection unit 130, a power unit 140, and a control unit 150.

The determination unit 110 may determine any one of a plurality of Radio Access Technologies (RATs) as a temporary control RAT. Accordingly, the determination unit 110 may transmit a neighbor discovery frame with respect to each of the plurality of RATs to a receiving CR communication apparatus. The receiving CR communication apparatus may be a P2P receiver or any other type of CR communication apparatus known to one of ordinary skill in the art. Also, the determination unit 110 may receive a neighbor discovery response frame in response to the neighbor discovery frame. In response to the neighbor discovery frame being received, the determination unit 110 may determine an RAT, which is used to receive the neighbor discovery response frame from the receiving CR communication apparatus which receives the neighbor discovery frame, as the temporary control RAT.

The estimation unit 120 may estimate an available resource and a channel state of each common RAT using the temporary control RAT. The common RATs may be used by the CR communication apparatus and the receiving CR communication apparatus from among the plurality of RATs. Accordingly, the estimation unit 120 may transmit a probe request frame to the receiving CR communication frame, and receive a probe response frame in response to the probe request frame. The estimation unit 120 may estimate the available resource and the channel state using the probe request frame and the probe response frame.

Referring to FIG. 1, the estimation unit 120 may flexibly determine an estimation index of the available resource depending on a characteristic of each of the common RATs. For example, the estimation unit 120 may estimate an idle time ratio of a corresponding channel as an available resource of a first RAT. Here, the first RAT may use a Time Division Duplex/Time Division Multiple Access (TDD/TDMA) MAC from among the common RATs.

Also, the estimation unit 120 may estimate a residual bandwidth and an idle time of a corresponding channel as an available resource of a second RAT. Here, the second RAT may use a Frequency Division Duplex/Frequency Division Multiple Access (FDD/FDMA) MAC from among the common RATs.

Also, the estimation unit 120 may estimate a number of available codes and a tolerable interference as an available resource of a third RAT. Here, the third RAT may use a Code Division Multiple Access (CDMA) MAC from among the common RATs.

The selection unit 130 may calculate the available capacity of each of the common RATs using at least one of the available resource, the channel state, a bandwidth, a maximum transmission power, and an amount of traffic load of each of the common RATs. Accordingly, the selection unit 130 may flexibly determine an operation of calculating the available capacity of each of the common RATs depending on the characteristic of each of the common RATs.

For example, the selection unit 130 may calculate, as an available capacity of the first RAT, an amount of traffic load of each of a forward link and a reverse link with respect to the receiving CR communication apparatus, during an entire time of being associated with an available resource of each of the forward link and the reverse link.

Also, the selection unit 130 may calculate, as an available capacity of the second RAT, an amount of traffic load which is transmitted using an available resource of each of the forward link and the reverse link with respect to the receiving CR communication apparatus.

The selection unit 130 may select the optimum RAT from the common RATs based on each of the available capacities. In this instance, the selection unit 130 may select an RAT that maximizes a sum of available capacities of the forward link and the reverse link with respect to the receiving CR communication apparatus, as the optimum RAT from the common RATs.

Also, the selection unit 130 may select an RAT that maximizes an insignificant available capacity from among available capacities of the forward link and the reverse link with respect to the receiving CR communication apparatus, as the optimum RAT from the common RATs.

After a list of the common RATs is confirmed, the power unit 140 may turn off remaining RATs excluding the common RATs from among the plurality of RATs. Also, the power unit 140 may turn off remaining RATs excluding the selected optimum RAT, where the optimum RAT is selected. Accordingly, the power unit 140 may prevent power of the CR communication apparatus from being wasted.

The control unit 150 may control an operation of the CR communication apparatus 100, that is, the determination unit 110, the estimation unit 120, the selection unit 130, and the power unit 140.

Figure 2:
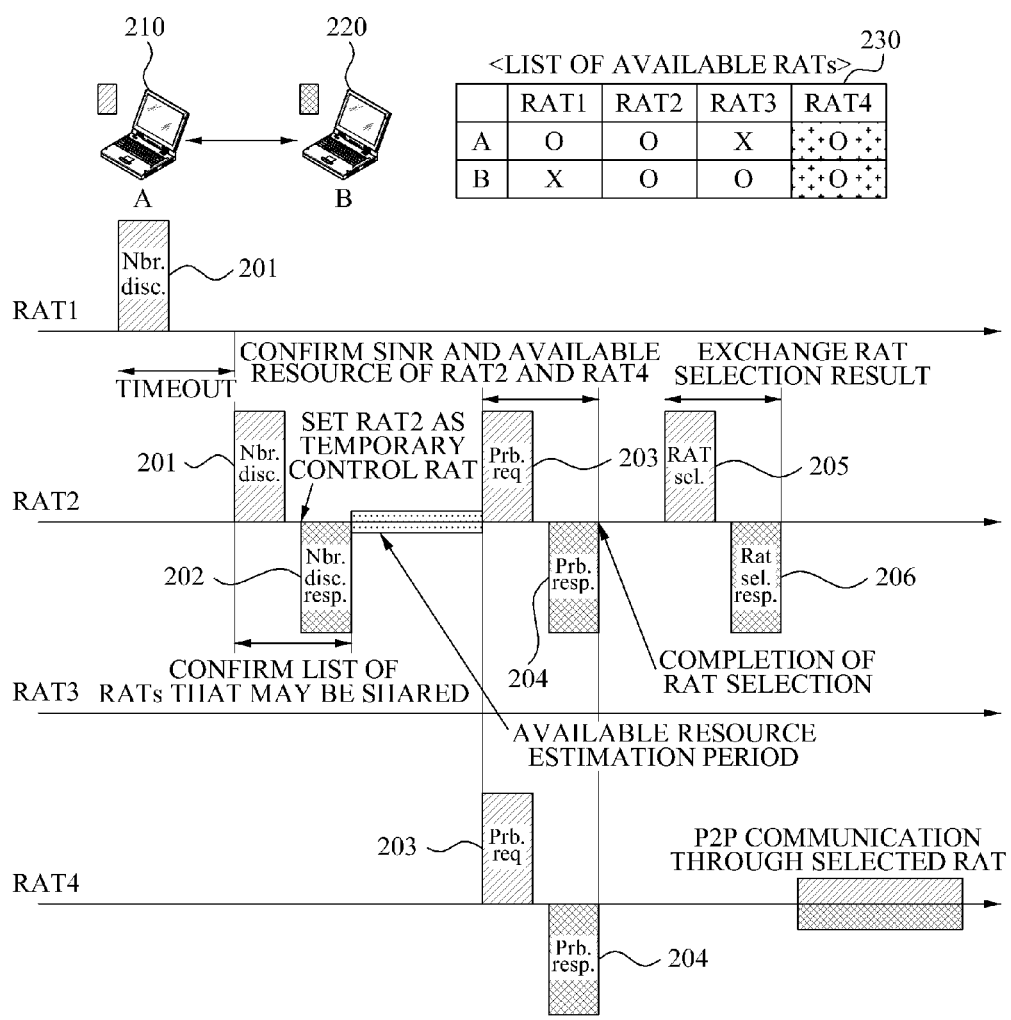
FIG. 2 is a diagram illustrating an example of selecting an optimum Radio Access Technology (RAT).

FIG. 2 illustrates an example of selecting an optimum RAT.

As illustrated in FIG. 2, a CR communication apparatus 210 may transmit a neighbor discovery frame 201 using all available RATs, and wait for a neighbor discovery response frame 202 to retrieve receiving CR communication apparatus 220 to perform P2P communication. Here, the CR communication apparatus 210 may be a P2P transmitter, and the receiving CR communication apparatus 220 may be a P2P receiver. Also, the neighbor discovery response frame 202 may include a response from the receiving CR communication apparatus 220. In response to the receiving CR communication apparatus 220 not being retrieved due to timeout as in RAT1, P2P traffic may not be transmitted. Accordingly, the CR communication apparatus 210 may repeat an operation of retrieving the receiving CR communication apparatus 220 after a predetermined idle time.

The P2P receiver 220 receiving the neighbor discovery frame 201 may transmit the neighbor discovery response frame 202 through an RAT receiving the neighbor discovery frame 201. Accordingly, the RAT may be a temporary control RAT.

Figure 3:
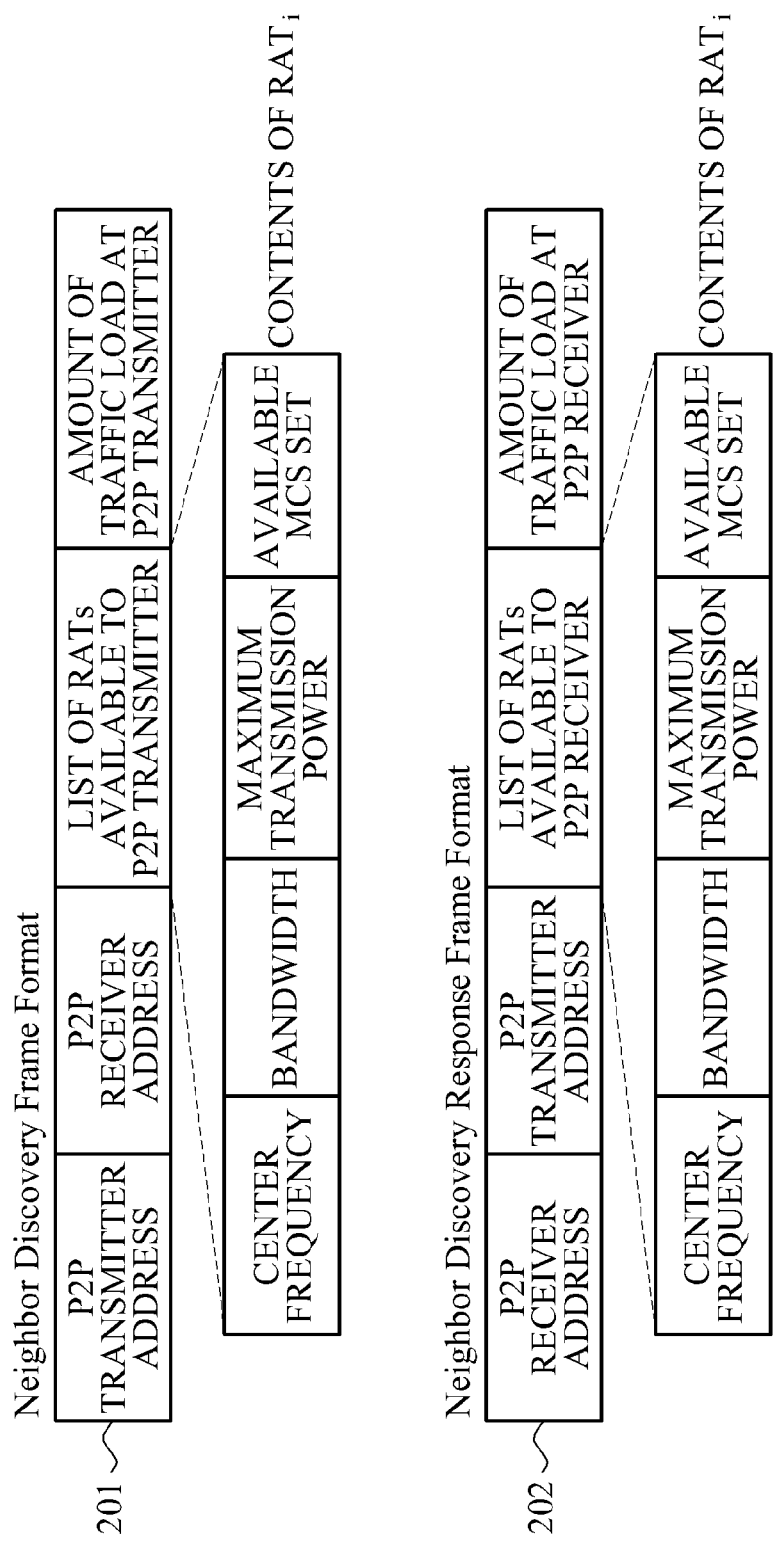

As illustrated in FIG. 3, the neighbor discovery frame 201 and the neighbor discovery response frame 202 includes an available RAT list of each of the P2P transmitter 210 and the P2P receiver 220 and an amount of P2P traffic load due to transmission. The available RAT list may include a center frequency, a bandwidth, a maximum transmission power of each RAT, and a Modulation and Coding Scheme (MCS) set.

Referring to FIGS. 2 and 3, where the P2P transmitter 210 and the P2P receiver 220 transmits and/or receives the neighbor discovery frame 201 and the neighbor discovery response frame 202 to and/or from each other, the CR communication apparatus 210 and the receiving CR communication apparatus 220 may ascertain the amount of traffic load and a list 230 of available RATs that may be used by the CR communication apparatus 210 and the receiving CR communication apparatus 220.

The CR communication apparatus 210 and the receiving CR communication apparatus 220 may turn off an RAT that may not be used by both the CR communication apparatus 210 and the receiving CR communication apparatus 220, and thereby may prevent unnecessary power consumption.

Referring to FIGS. 2 and 3, the P2P transmitter 210 and the P2P receiver 220, that confirm the list 230, may estimate an available capacity and a channel state of each RAT. First, the P2P transmitter 210 and the P2P receiver 220 may turn on RATs, that may be shared, and estimate an available resource during an available capacity estimation period.

Accordingly, the estimation of the available resource of each of the RATs may vary depending on a MAC characteristic of a corresponding RAT. That is, an idle time of a wireless channel may represent the available resource in a TDD/TDMA system, and an idle time and a residual bandwidth of a wireless channel may represent the available resource in a FDD/FDMA system. Also, a number of available codes and tolerable interference may represent the available resource in a CDMA system.

For example, where an RAT uses a distributed TDD/TDMA MAC regardless of a transmitting and/or receiving resource like an Institute of Electrical and Electronics Engineers (IEEE) 802.11 Wireless Local Area Network (WLAN), the CR communication apparatus 210 may represent an amount of entire available resources as an idle time ratio with respect to an idle time estimated corresponding to a predetermined time period without separating a forward link and a reverse link.

Also, where an RAT uses an Orthogonal Frequency Division Multiple Access (OFDMA) MAC by separating a transmitting and/or receiving resource by TDD based on scheduling as in an IEEE 802.16 Wireless Metropolitan Area Network (WMAN), the CR communication apparatus 210 may follow scheduling information about a plan of using a frequency resource, and separately represent an amount of an available resource of each of the forward link and the reverse link as an idle slot ratio of a number of resource slots of an empty forward link and an empty reverse link to a number of entire resource slots. Accordingly, a slot may be a minimum unit of wireless resource defined in the WMAN, and indicate a two-dimensional (2D) frequency resource of a frequency bandwidth and a time length.

Sequentially, the P2P transmitter 210 and the P2P receiver 220 may transmit and/or receive a probe request frame 203 and a probe response frame 204 to and/or from each other, and estimate a channel state of each of the RATs. The available capacity estimation period may be reported to all available CR communication apparatuses in an initial P2P network installment phase.

As illustrated in FIG. 4, the probe request frame 203 may include information about an available capacity estimated for each RAT by the P2P transmitter 210. Also, the probe response frame 204 may include information about an available capacity estimated corresponding to each RAT by the P2P receiver 220 and a Signal to Inference plus Noise Ratio (SINR) information of the P2P receiver 220 with respect to the probe request frame 203.

Accordingly, the P2P transmitter 210 may collect information about the available resource for each RAT and the SINR of the P2P receiver 220, and information about a bandwidth and maximum transmission power of each of the RATs. Also, other CR communication apparatuses as well as the P2P transmitter 210 and the P2P receiver 220 may indirectly collect the information of the P2P transmitter 210 and the P2P receiver 220 by overhearing the information. The P2P transmitter 210 may calculate an available capacity of each of a forward link and a reverse link based on the collected information. The forward link may extend from the P2P transmitter 210 to the P2P receiver 220, and the reverse link may extend from the P2P receiver 220 to the P2P transmitter 210.

That is, the P2P transmitter 210 may calculate the available capacity of each of the forward link and the reverse link based on an amount of P2P traffic load of the forward link, an amount of P2P traffic load of the reverse link, the available resource corresponding to each of the RATs, the SINR information, the bandwidth, and the maximum transmission power information of each of the RATs. In this instance, a unit used corresponding to the calculation of the available capacity may vary depending on a MAC characteristic of each of the RATs, or may be fixed to perform an accurate comparison. The available capacity may be represented as a "bits per second throughput" which is expected to be transmitted per each unit time.

For example, in an RAT using the IEEE 802.11 WLAN MAC, the P2P transmitter 210 may calculate, as the available capacity, an information amount of traffic transmitted by the forward link and the reverse link, during an entire time period of being associated with an idle time ratio of each of the forward link and the reverse link, according to Equation 1 as presented below.

$$\langle \text{available capacity of forward link} \rangle = \frac{(\text{Idle time ratio})}{\alpha \overline{T}_{tx} + (1-\alpha)\overline{T}_{rx}} \alpha \overline{S}_{tx} \quad [\text{Equation 1}]$$

$$\langle \text{available capacity of reverse link} \rangle = \frac{(\text{Idle time ratio})}{\alpha \overline{T}_{tx} + (1-\alpha)\overline{T}_{rx}} (1-\alpha)\overline{S}_{rx}$$

$\alpha$: ratio of a forward link traffic and a reverse link traffic
$\overline{T}_{tx}(\overline{T}_{rx})$: average time consumed to transmit a single frame in a forward (reverse) link
$\overline{S}_{tx}(\overline{S}_{rx})$: average frame length of a forward (reverse) link Also, in an RAT using the IEEE 802.16 WLAN MAC, the P2P transmitter 210 may calculate, as the available capacity, an information amount of traffic transmitted using an idle slot ratio that may be used in the forward link and the reverse link according to Equation 2 as presented below.

$$\langle \text{available capacity of forward link} \rangle = \frac{(\text{Idle slot } ratio_{tx})}{T_{frame}} \alpha \overline{S}_{tx} \quad [\text{Equation 2}]$$

$$\langle \text{available capacity of reverse link} \rangle = \frac{(\text{Idle slot } ratio_{tx})}{T_{frame}} (1-\alpha)\overline{S}_{rx}$$

Idle slot ratio$_{tx}$(Idle slot ratio$_{rx}$): idle time ratio of a forward (reverse) link
$T_{frame}$: time length of an entire WMAN frame
$\overline{S}_{tx}(\overline{S}_{rx})$: average frame length of a forward (reverse) link After calculating the available capacity of each of the forward link and the reverse link, the P2P transmitter 210 may select an RAT that may obtain a maximum utility based on a utility function. The utility function may indicate which of the available capacities of the forward link and the reverse link is used to select an RAT. Basically, the P2P transmitter 210 may select an RAT where a given utility function is maximized according to Equation 3 as presented below.

$$k^* = \max_k U(k) \quad \text{[Equation 3]}$$

U(k): utility function of $RAT_k$
k*: selected optimum RAT

In this instance, the P2P transmitter 210 may select an RAT that maximizes an insignificant available capacity from among the available capacities of the forward link and the reverse link according to Equation 4 as presented below, or may select an RAT that maximizes a sum of available capacities of the forward link and the reverse link, according to Equation 5 also as presented below.

U(k)=min{(available capacity of forward link), (available capacity of reverse link)} [Equation 4]

U(k): utility function of $RAT_k$

Figure 5:
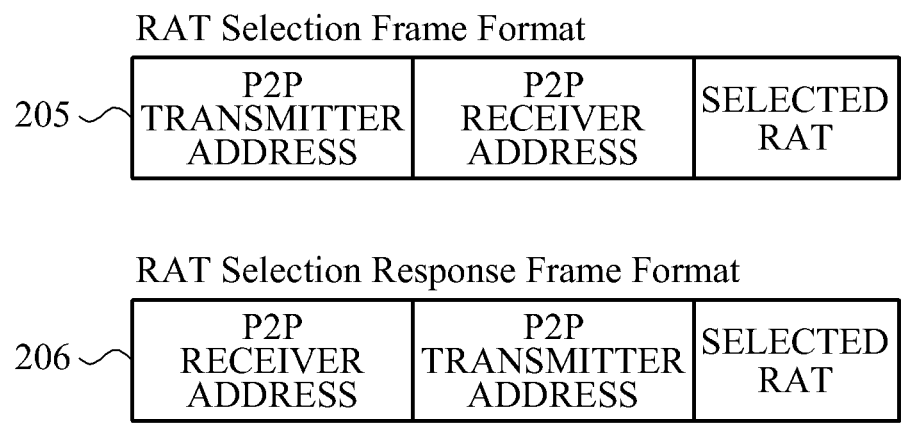

U(k): α·(available capacity of forward link)+(1−α)·(available capacity of reverse link) [Equation 5]

α: ratio of a forward link traffic and a reverse link traffic
U(k): utility function of $RAT_k$ Also, the P2P transmitter 210 may transmit an RAT selection frame 205 through a temporary control RAT to report a list of the selected RAT to the P2P receiver 220, the P2P receiver 220 may transmit an RAT selection response frame 206 in response to the RAT selection frame 205, and thus an operation of selecting an RAT may be completed. As illustrated in FIG. 5, the selection frame 205 and the RAT selection response frame 206 may include information about the selected RAT.

After the selecting is completed, the P2P transmitter 210 and the P2P receiver 220 may turn off remaining RATs excluding the selected RAT, and thereby may prevent power of CR communication apparatuses from being wasted.

Figure 6:
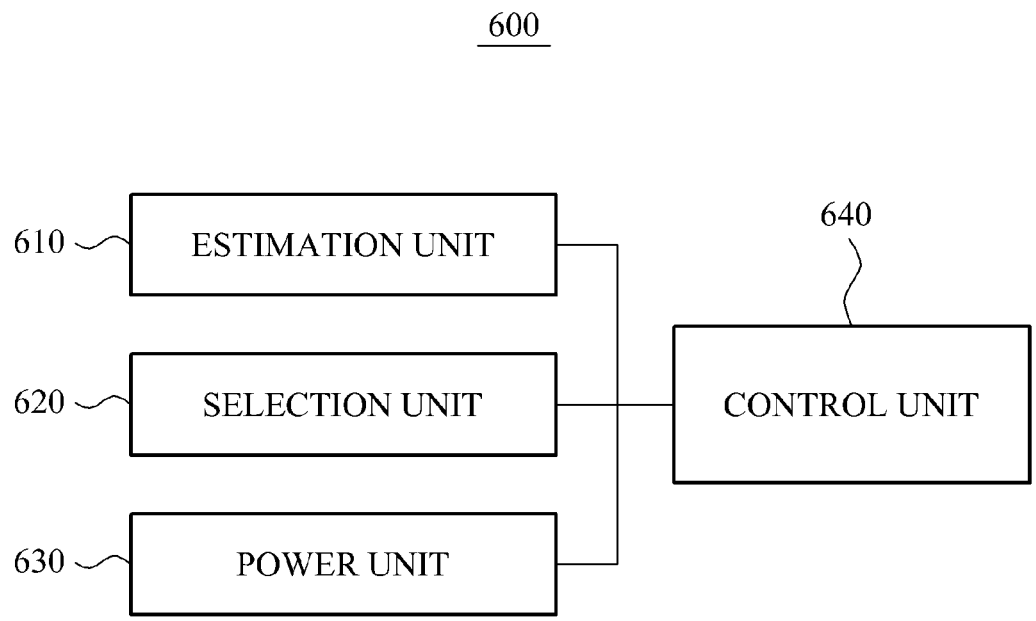
FIG. 6 is a block diagram illustrating a configuration of another example of CR communication apparatus.

FIG. 6 illustrates a configuration of another example of a CR communication apparatus 600. For example, FIG. 6 illustrates the CR communication apparatus 600 which selects an optimum RAT to perform P2P communication where a CCR exists.

Referring to FIG. 6, the CR communication apparatus 600 includes an estimation unit 610, a selection unit 620, a power unit 630, and a control unit 640.

The estimation unit 610 may confirm common RATs through the CCR, and estimate an available resource and a channel state of each of the common RATs. The common RATs may be used by the CR communication apparatus 600 and an opposing CR communication apparatus. For this, the estimation unit 610 may transmit a probe request frame to the opposing CR communication apparatus, and receive a probe response frame in response to the probe request frame. The estimation unit 610 may estimate the available resource and the channel state using the probe response frame and the probe request frame.

Accordingly, the estimation unit 610 may flexibly determine an estimation index of the available resource depending on a characteristic of each of the common RATs. For example, the estimation unit 610 may estimate an idle time ratio of a corresponding channel as an available resource of a first RAT. Here, the first RAT may use a TDD/TDMA MAC from among the common RATs.

Also, the estimation unit 610 may estimate a residual bandwidth and an idle time of a corresponding channel as an available resource of a second RAT. Here, the second RAT may use a FDD/FDMA MAC from among the common RATs.

Also, the estimation unit 610 may estimate a number of available codes and a tolerable interference as an available resource of a third RAT. Here, the third RAT may use a CDMA MAC from among the common RATs.

The selection unit 620 may calculate an available capacity of each of the common RATs using at least one of the available resource, the channel state, a bandwidth, maximum transmission power, and an amount of traffic load of each of the common RATs. Accordingly, the selection unit 620 may flexibly determine an operation of calculating the available capacity of each of the common RATs depending on the characteristic of each of the common RATs.

For example, the selection unit 620 may calculate, as an available capacity of the first RAT, an amount of traffic load of each of a forward link and a reverse link with respect to the opposing CR communication apparatus, during an entire time of being associated with an available resource of each of the forward link and the reverse link.

Also, the selection unit 620 may calculate, as an available capacity of the second RAT, an amount of traffic load which is transmitted using the available resource of each of the forward link and the reverse link with respect to the opposing CR communication apparatus.

The selection unit 620 may select the optimum RAT from the common RATs based on each of the available capacities. Accordingly, the selection unit 620 may select an RAT that maximizes a sum of available capacities of the forward link and the reverse link with respect to the opposing CR communication apparatus, from the common RATs as the optimum RAT.

Also, the selection unit 620 may select an RAT that maximizes an insignificant available capacity from among the available capacities of the forward link and the reverse link with respect to the opposing CR communication apparatus, from the common RATs as the optimum RAT.

In response to another CR communication apparatus transmitting an RAT selection frame including the optimum RAT before the CR communication apparatus 600 transmits the RAT selection frame, the selection unit 620 may confirm a remaining available capacity excluding a capacity, used by the other CR communication apparatus, from among an available capacity of the optimum RAT, and may select the optimum RAT from the common RATs.

The selection unit 620 may select the optimum RAT from the common RATs based on a priority for each traffic with respect to each traffic. Here, the priority may be assigned by a MAC.

In response to a list of the common RATs being confirmed, the power unit 630 may turn off remaining RATs excluding the common RATs from among the plurality of RATs. Also, in response to the optimum RAT being selected, the power unit 630 may turn off remaining RATs excluding the selected optimum RAT.

The control unit 640 may control an operation of the CR communication apparatus 600, that is, the estimation unit 610, the selection unit 620, and the power unit 630.

Figure 7A:
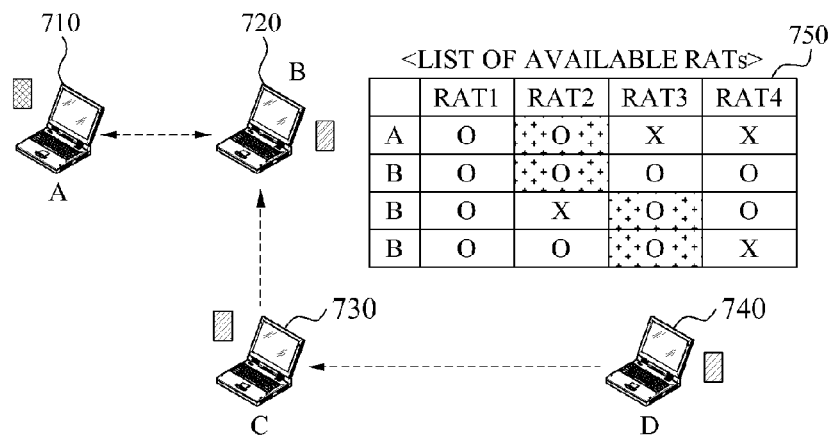
FIG. 7a and FIG. 7b are a diagram illustrating another example of selecting an optimum RAT.
Figure 7B:
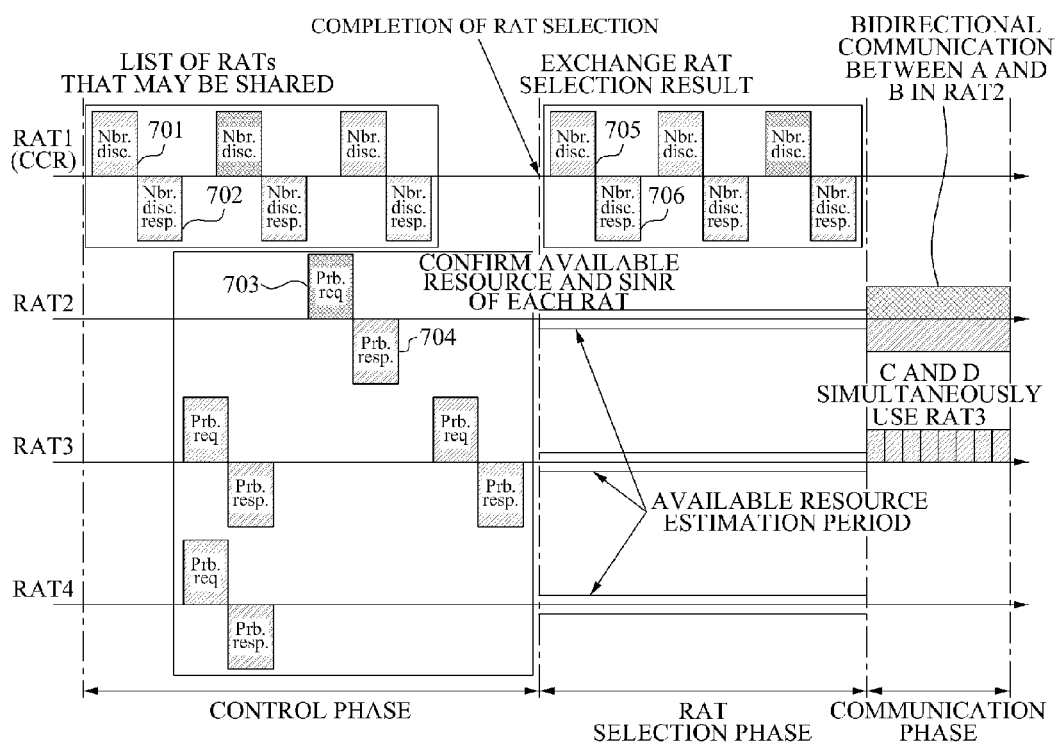

FIG. 7a and FIG. 7b illustrate another example of selecting an optimum RAT.

Referring to FIG. 7a and FIG. 7b, where a CCR exists, all CR communication apparatuses 710, 720, 730, and 740 may be operated efficiently and adaptively with respect to a state change of an RAT or generation and/or termination of P2P traffic. It may be presumed that whether the CCR exists is determined in an initial P2P network installment phase, and is reported to all the CR communication apparatuses 710, 720, 730, and 740. Here, the P2P network may include the CR communication apparatuses 710, 720, 730, and 740.

All the CR communication apparatuses 710, 720, 730, and 740 may be operated by repeating a control phase, an RAT selection phase, and a communication phase. It may be presumed that a cycle and a time length of each of the phases are reported to all the CR communication apparatuses 710, 720, 730, and 740 in the initial P2P network installment phase.

In the control phase, all the CR communication apparatuses 710, 720, 730, and 740 may turn on all the RATs. Also, a P2P transmitter may transmit a neighbor discovery frame 701 using a CCR to report a demand of P2P traffic to a P2P receiver. For reference, the CR communication apparatus A 710 and the CR communication apparatus C 730 may each be a P2P transmitter, and the CR communication apparatus B 720 may be the P2P receiver among the CR communication apparatuses A 710, B 720, and C 730 in FIG. 7a. Also, the CR communication apparatus D 740 may be the P2P transmitter and the CR communication apparatus C 730 may be the P2P receiver among the CR communication apparatuses C 730 and D 740.

The P2P receiver receiving the neighbor discovery frame 701 may transmit a neighbor discovery response frame 702 through the CCR. Where the P2P receiver is not retrieved, the P2P traffic may not be transmitted. Accordingly, an operation to retrieve the P2P receiver may be repeated in a current control phase. Where the P2P receiver is not retrieved until the current control phase ends, an identical operation may be repeated in a subsequent control phase.

The P2P transmitter receiving the neighbor discovery response frame 702 may confirm common RATs, that is, RATs that may be used by the P2P transmitter and the P2P receiver, using a list 750 of available RATs. The list 750 of available RATs may be included in the neighbor discovery response frame 702. The P2P transmitter may transmit a probe request frame 703 to the P2P receiver using the common RATs to estimate an SINR of each RAT. Also, the P2P transmitter may receive a probe response frame 704 in response to the probe request frame 703.

The transmission of the neighbor discovery frame 701 through the receiving of the probe response frame 704 may be serially performed in the P2P transmitter, which is referred to as a P2P communication initialization process. The P2P communication initialization process may be repeated by different P2P transmitters before the control phase ends.

Where the control phase ends, the P2P transmitters successfully completing the P2P communication initialization process may select an optimum RAT using an "operation of RAT selection phase" and an "operation of communication phase" described below.

In the RAT selection phase, all the CR communication apparatuses 710, 720, 730, and 740 may turn on all the RATs, and estimate an available resource of each of the RATs using other RATs as opposed to the CCR, and thus the estimation result may affect a subsequent control phase. Accordingly, the P2P transmitters selecting the optimum RAT in the previous control phase may transmit an RAT selection frame 705 through the CCR in the RAT selection phase, and thereby may report a result of the selection to the P2P receiver. The P2P receiver may transmit an RAT selection response frame 706 to the P2P transmitters in response to the RAT selection frame 705.

Accordingly, a method of transmitting the RAT selection frame 705 may be based on a MAC layer operation of an RAT, and thus the MAC layer operation may be flexibly adjusted depending on the selection of the RAT. In particular, where an RAT uses a MAC that may assign a different priority corresponding to each transmission, the P2P transmitters may control traffic transmission with a high priority such as voice traffic to select an RAT earlier.

Where another P2P transmitter transmits the RAT selection frame 705 before a corresponding P2P transmitter transmits the RAT selection frame 705, the P2P transmitters overhearing the transmission may confirm a remaining available capacity excluding a capacity, used by the other P2P transmitter, from among an available capacity of the optimum RAT.

Where the remaining available capacity does not satisfy a predetermined standard, P2P transmitters selecting the same RAT may cancel the selection and enter a stand-by mode until a subsequent control phase.

In the communication phase, all the CR communication apparatuses 710, 720, 730, and 740 may turn off all RATs that are not used to perform communication, and thereby may prevent unnecessary power consumption. A P2P transmitter and a P2P receiver that are successful in selecting an RAT in the previous RAT selection phase may join the P2P communication using the selected RAT. A channel access control among the P2P transmitters, selecting the same RAT, may be based on a MAC layer operation of a corresponding RAT.

FIG. 8 illustrates an example of a method of selecting an RAT in a CR communication apparatus. For example, FIG. 8 illustrates a method of selecting an RAT where a CCR does not exist.

At operation 801, the P2P transmitter 810 and the P2P receiver 820 turn on all RATs.

At operation 802, the P2P transmitter 810 transmits a neighbor discovery frame to the P2P receiver 820, and receives a neighbor discovery response frame in response to the neighbor discovery frame. The P2P transmitter 810 may repeatedly transmit the neighbor discovery frame until the neighbor discovery response frame is received. Accordingly, the P2P transmitter 810 may determine an RAT, used when the P2P receiver 820 receives the neighbor discovery response frame, as a temporary control RAT.

At operation 803, the P2P transmitter 810 and the P2P receiver 820 turn off RATs that may not be shared from among all the RATs. That is, the P2P transmitter 810 and the P2P receiver 820 may maintain the power-on state of RATs that may be used by the P2P transmitter 810 and the P2P receiver 820 from among all the RATs.

At operation 804, the P2P transmitter 810 and the P2P receiver 820 estimate an available resource of each of the RATs that may be shared.

At operation 805, the P2P transmitter 810 transmits a probe request frame to the P2P receiver 820, and the P2P receiver 820 transmits a probe response frame to the P2P transmitter 810 in response to the probe request frame. That is, the P2P transmitter 810 and the P2P receiver 820 may transmit and/or receive the probe request frame and the probe response frame to and/or from each other by repeating transmitting and/or receiving as many probes as a number of RATs that may be shared.

At operation 806, the P2P transmitter 810 selects an optimum RAT from the RATs that may be shared. Accordingly, the P2P transmitter 810 may calculate an available capacity using an available resource, a channel state, and the like of each of the RATs. Accordingly, the available capacity may be used as a standard to select the optimum RAT.

At operation 807, the P2P transmitter 810 transmits an RAT selection frame including the selected RAT to the P2P receiver 820 using the temporary control RAT. The P2P receiver 820 transmits an RAT selection response frame to the P2P transmitter 810. That is, the P2P transmitter 810 and the P2P receiver 820 may exchange the RAT selection frame and the RAT selection response frame, and thereby may complete the operation of selecting the optimum RAT.

At operation 808, the P2P transmitter 810 and the P2P receiver 820 turn off remaining RATs excluding the selected RAT.

At operation 809, the P2P transmitter 810 and the P2P receiver 820 perform communication using the selected RAT.

Figure 9:
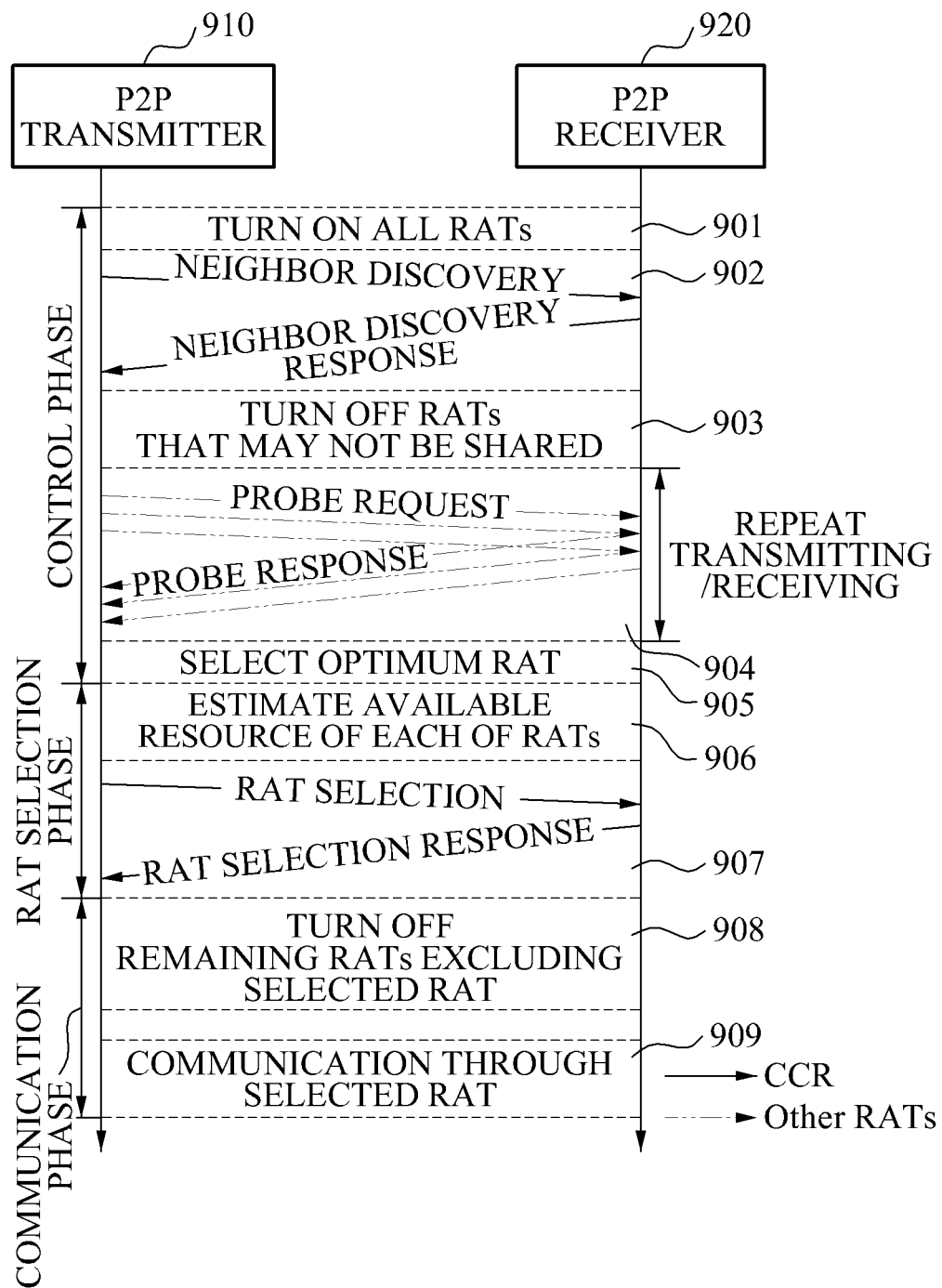
FIG. 9 is a flowchart illustrating another example of a method of selecting an RAT in a CR communication apparatus.

FIG. 9 illustrates another example of a method of selecting an RAT in a CR communication apparatus. For example, FIG. 9 illustrates an example of a method of selecting an RAT where a CCR exists.

At operation 901, a P2P transmitter 910 and a P2P receiver 920 may turn on all RATs.

At operation 902, the P2P transmitter 910 transmits a neighbor discovery frame to the P2P receiver 920 through the CCR, and receives a neighbor discovery response frame in response to the neighbor discovery frame.

At operation 903, the P2P transmitter 910 and the P2P receiver 920 turn off RATs that may not be shared from among all the RATs. That is, the P2P transmitter 910 and the P2P receiver 920 may maintain the power-on state of RATs that may be shared from among all the RATs.

At operation 904, the P2P transmitter 910 transmits a probe request frame to the P2P receiver 920 using each of the RATs that may be shared, and the P2P receiver 920 transmits a probe response frame to the P2P transmitter 910 in response to the probe request frame using each of the RATs that may be shared. That is, the P2P transmitter 910 and the P2P receiver 920 may exchange the probe request frame and the probe response frame by repeating transmitting and/or receiving as many probes as a number of RATs that may be shared.

At operation 905, the P2P transmitter 910 selects an optimum RAT from the RATs that may be shared.

For reference, the turning on at 901 through the selecting at 905 may be included in the control phase described above.

At operation 906, the P2P transmitter 910 and the P2P receiver 920 estimate an available resource of each of the RATs that may be shared, which may be an estimate of an available resource of the CCR.

At operation 907, the P2P transmitter 910 transmits an RAT selection frame including the selected RAT to the P2P receiver 920 using the CCR. The P2P receiver 920 transmits an RAT selection response frame to the P2P transmitter 910 using the CCR. That is, the P2P transmitter 910 and the P2P receiver 920 may exchange the RAT selection frame and the RAT selection response frame, and thereby may complete the operation of selecting the optimum RAT.

For reference, the estimating at 906 and the transmitting and/or receiving at 907 may be included in the selection phase described above.

At operation 908, the P2P transmitter 910 and the P2P receiver 920 turn off remaining RATs excluding the selected RAT.

At operation 909, the P2P transmitter 910 and the P2P receiver 920 perform communication using the selected RAT.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media may include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer system connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Cognitive Radio (CR) communication apparatus, comprising:
   a determination unit configured to determine any one of a plurality of Radio Access Technologies (RATs) as a temporary control RAT;
   an estimation unit configured to estimate an available resource and a channel state of each common RAT using the temporary control RAT, the common RATs being used by the CR communication apparatus and an a receiving CR communication apparatus from among the plurality of RATs; and
   a selection unit configured to calculate an available capacity of each of the common RATs using the available resource and the channel state, and to select an optimum RAT from the common RATs based on the available capacity of each of the common RATs.

2. The CR communication apparatus of claim 1, wherein the determination unit is further configured to transmit a neighbor discovery frame to the receiving CR communication apparatus using each of the plurality of RATs, and to determine an RAT, which is used to receive a neighbor discovery response frame from the receiving CR communication apparatus receiving the neighbor discovery frame, as the temporary control RAT.

3. A Cognitive Radio (CR) communication apparatus, comprising:
   an estimation unit configured to confirm common Radio Access Technologies (RATs) through a Common Control RAT (CCR), and to estimate an available resource and a channel state of each of the common RATs, the common RATs being used by the CR communication apparatus and an receiving CR communication apparatus; and
   a selection unit configured to calculate an available capacity of each of the common RATs using the available resource and the channel state, and to select an optimum RAT from the common RATs based on the available capacity of each of the common RATs.

4. The CR communication apparatus of claim 3, wherein the selection unit is further configured to select the optimum RAT from the common RATs based on a priority of each transmission with respect to transmission traffic, the priority being assigned by a Media Access Control (MAC).

5. The CR communication apparatus of claim 3, wherein, in response to another CR communication apparatus being transmitted an RAT selection frame including the optimum RAT before the CR communication apparatus transmits the RAT selection frame including the optimum RAT, the selection unit is further configured to confirm a remaining available capacity excluding a capacity, used by the other CR communication apparatus, from among an available capacity of the optimum RAT, and to select the optimum RAT from the common RATs.

6. The CR communication apparatus of claim 3, further comprising:
    a power unit configured to, in response to a list of the common RATs being confirmed, turn off remaining RATs excluding the common RATs from among the plurality of RATs, and in response to the optimum RAT being selected, to turn off remaining RATs excluding the selected optimum RAT.

7. The CR communication apparatus of claim 3, wherein the estimation unit is further configured to transmit a probe request frame to the receiving CR communication frame, to receive a probe response frame in response to the probe request frame, and to estimate the available resource and the channel state using the probe request frame and the probe response frame.

8. The CR communication apparatus of claim 3, wherein the estimation unit is further configured to estimate an idle time ratio of a corresponding channel as an available resource of a first RAT, the first RAT using a Time Division Duplex/Time Division Multiple Access (TDD/TDMA) MAC from among the common RATs.

9. The CR communication apparatus of claim 3, wherein the estimation unit is further configured to estimate a residual bandwidth and an idle time of a corresponding channel as an available resource of a second RAT, the second RAT using a Frequency Division Duplex/Frequency Division Multiple Access (FDD/FDMA) MAC from among the common RATs.

10. The CR communication apparatus of claim 3, wherein the estimation unit is further configured to estimate a number of available codes and a tolerable interference as an available resource of a third RAT, the third RAT using a Code Division Multiple Access (CDMA) MAC from among the common RATs.

11. The CR communication apparatus of claim 3, wherein the selection unit is further configured to calculate the available capacity using a bandwidth, or maximum transmission power, or an amount of traffic load of each of the common RATs, or any combination thereof.

12. The CR communication apparatus of claim 3, wherein the selection unit is further configured to calculate, as an available capacity of a first RAT, an amount of traffic load of each of a forward link and a reverse link with respect to the receiving CR communication apparatus during an entire time of being associated with an available resource of each of the forward link and the reverse link, the first RAT using a TDD/TDMA MAC from among the common RATs.

13. The CR communication apparatus of claim 3, wherein the selection unit is further configured to calculate, as an available capacity of a second RAT, an amount of traffic load which is transmitted using an available resource of each of a forward link and a reverse link with respect to the receiving CR communication apparatus, the second RAT using a FDD/FDMA MAC from among the common RATs.

14. The CR communication apparatus of claim 3, wherein the selection unit is further configured to select an RAT that maximizes an insignificant available capacity from among available capacities of a forward link and a reverse link with respect to the receiving CR communication apparatus, as the optimum RAT from the common RATs.

15. The CR communication apparatus of claim 3, wherein the selection unit is further configured to select an RAT that maximizes a sum of available capacities of a forward link and a reverse link with respect to the receiving CR communication apparatus, as the optimum RAT from the common RATs.

16. A Radio Access Technology (RAT) selection method of a Cognitive Radio (CR) communication apparatus, the RAT selection method comprising:
    determining any one of a plurality of RATs as a temporary control RAT;
    estimating an available resource and a channel state of each common RAT using the temporary control RAT, the common RATs being used by the CR communication apparatus and an opposing CR communication apparatus from among the plurality of RATs;
    calculating an available capacity of each of the common RATs using the available resource and the channel state; and
    selecting an optimum RAT from the common RATs based on the available capacity of each of the common RATs.

17. A Radio Access Technology (RAT) selection method of a Cognitive Radio (CR) communication apparatus, the RAT selection method comprising:
    confirming common RATs through a Common Control RAT (CCR), and estimating an available resource and a channel state of each of the common RATs, the common RATs being used by the CR communication apparatus and an opposing CR communication apparatus; and
    calculating an available capacity of each of the common RATs using the available resource and the channel state; and
    selecting an optimum RAT from the common RATs based on the available capacity of each of the common RATs.

18. The RAT selection method of claim 17, wherein the selecting of the optimum RAT comprises:
    confirming, in response to another CR communication apparatus transmitting an RAT selection frame including the optimum RAT before the CR communication apparatus transmits the RAT selection frame including the optimum RAT, a remaining available capacity excluding a capacity, used by the other CR communication apparatus, from among an available capacity of the optimum RAT; and
    reselecting the optimum RAT from the common RATs.

19. The RAT selection method of claim 17, wherein the calculating of the available capacity comprises:
    calculating the available capacity using a bandwidth, or maximum transmission power, or an amount of traffic load of each of the common RATs, or any combination thereof.

20. The RAT selection method of claim 17, wherein the calculating of the available capacity comprises:
    calculating, as an available capacity of a first RAT, an amount of traffic load of each of a forward link and a reverse link with respect to the opposing CR communication apparatus during an entire time of being associated with an available resource of each of the forward link and the reverse link, the first RAT using a TDD/TDMA MAC from among the common RATs.

21. The RAT selection method of claim 17, wherein the calculating of the available capacity comprises:

calculating, as an available capacity of a second RAT, an amount of traffic load which is transmitted using an available resource of each of a forward link and a reverse link with respect to the opposing CR communication apparatus, the second RAT using a FDD/FDMA MAC from among the common RATs.

22. The RAT selection method of claim 17, wherein the selecting of the optimum RAT comprises:

selecting an RAT that maximizes an insignificant available capacity from among available capacities of a forward link and a reverse link with respect to the opposing CR communication apparatus, as the optimum RAT from the common RATs.

23. The RAT selection method of claim 17, wherein the selecting of the optimum RAT comprises:

selecting an RAT that maximizes a sum of available capacities of a forward link and a reverse link with respect to the opposing CR communication apparatus, as the optimum RAT from the common RATs.

24. A non-transitory computer-readable storage medium storing a program comprising instructions to cause a computer to implement a Radio Access Technology (RAT) selection method of a Cognitive Radio (CR) communication apparatus, comprising:

determining any one of a plurality of RATs as a temporary control RAT;

estimating an available resource and a channel state of each common RAT using the temporary control RAT, the common RATs being used by the CR communication apparatus and an opposing CR communication apparatus from among the plurality of RATs;

calculating an available capacity of each of the common RATs using the available resource and the channel state; and selecting an optimum RAT from the common RATs based on the available capacity of each of the common RATs.

* * * * *